(12) United States Patent
Manasek (10) Patent No.: US 12,435,926 B2
(45) Date of Patent: Oct. 7, 2025

(54) MULTI-HALF PIPE HEAT EXCHANGE SYSTEM FOR ELECTRIC ARC, METALLURGICAL OR REFINING FURNACES AND SYSTEM THEREOF

(71) Applicant: AMERIFAB, INC., Indianapolis, IN (US)

(72) Inventor: Richard J. Manasek, Carmel, IN (US)

(73) Assignee: AMERIFAB, INC., Indianapolis, IN (US)

( * ) Notice: Subject to any disclaimer, the term of this patent is extended or adjusted under 35 U.S.C. 154(b) by 1010 days.

(21) Appl. No.: 17/515,741

(22) Filed: Nov. 1, 2021

(65) Prior Publication Data
US 2022/0136770 A1    May 5, 2022

Related U.S. Application Data

(60) Provisional application No. 63/108,474, filed on Nov. 2, 2020.

(51) Int. Cl.
*F27B 3/24*      (2006.01)
*F27D 17/30*     (2025.01)
(Continued)

(52) U.S. Cl.
CPC .............. *F27B 3/24* (2013.01); *F27D 17/302* (2025.01); *F28F 3/12* (2013.01); *F27D 2009/0013* (2013.01); *F28F 2275/06* (2013.01)

(58) Field of Classification Search
CPC . C21D 1/42; C21D 9/46; H05B 6/101; H05B 6/104; H05B 6/362; H05B 6/44; Y02P 10/25
(Continued)

(56) References Cited

U.S. PATENT DOCUMENTS 60,461 A    12/1866  Bartlett
1,774,150 A  8/1930  Murray
(Continued)

FOREIGN PATENT DOCUMENTS

CN    2798016 Y    7/2006
DE    3701614 C2   8/1988
(Continued)

OTHER PUBLICATIONS

Extended European Search Report, EP Application No. 21887704.1, dated Sep. 26, 2024, 10 pgs.
(Continued)

*Primary Examiner* — Quang T Van
(74) *Attorney, Agent, or Firm* — Taft Stettinius & Hollister LLP; Stephen F. Rost (57) ABSTRACT

A cooling assembly for cooling exhaust gases emitted from a steel-making furnace includes a plate configured to be coupled to the furnace. The plate has a first surface and an opposing second surface. The assembly includes a body having a defined length and a cross-sectional shape having a thickness defined between an outer surface and an inner surface thereof. The body includes a first mounting end and a second mounting end, where the first mounting end is mounted to the first surface at a first angle greater than 0°. The second mounting end is also mounted to the first surface at a second angle greater than 0°, and the second mounting end is spaced from the first mounting end. A conduit is defined between the inner surface and first surface for a cooling fluid to flow therethrough.

11 Claims, 6 Drawing Sheets

(51) Int. Cl.
*F28F 3/12* (2006.01)
*F27D 9/00* (2006.01)

(58) Field of Classification Search
USPC .......................... 373/74, 71, 73, 75, 76, 93
See application file for complete search history.

(56) References Cited

U.S. PATENT DOCUMENTS

| | | |
|---|---|---|
| 1,844,407 A | 2/1932 | Murray |
| 2,239,662 A | 4/1941 | Bailey |
| 2,829,972 A | 4/1958 | Klement |
| 3,294,162 A | 12/1966 | Loehlein et al. |
| 3,706,343 A | 12/1972 | Saiga et al. |
| 3,725,056 A | 4/1973 | Ingerson |
| 3,849,587 A | 11/1974 | Hatch et al. |
| 4,033,561 A | 7/1977 | Dhelft |
| 4,054,174 A | 10/1977 | Haller |
| 4,097,679 A | 6/1978 | Fukumoto et al. |
| 4,122,295 A | 10/1978 | Nanjyo et al. |
| 4,135,575 A | 1/1979 | Gersch |
| 4,192,258 A | 3/1980 | Touze |
| 4,205,720 A | 6/1980 | Epstein |
| 4,207,060 A | 6/1980 | Zangs |
| 4,221,922 A | 9/1980 | Okimune |
| 4,327,899 A | 5/1982 | Suzuki et al. |
| 4,337,824 A | 7/1982 | Kirk |
| 4,351,055 A | 9/1982 | Bick et al. |
| 4,455,017 A | 6/1984 | Wunsche |
| 4,458,351 A | 7/1984 | Richards |
| 4,559,011 A | 12/1985 | Gritsuk et al. |
| 4,589,938 A | 5/1986 | Drosdick |
| 4,658,761 A | 4/1987 | Duggan |
| 4,694,864 A | 9/1987 | Libin |
| 4,871,014 A | 10/1989 | Sulzberger |
| 4,972,903 A | 11/1990 | Kwok |
| 5,241,559 A | 8/1993 | Hixenbaugh |
| 6,059,028 A | 5/2000 | Kincheloe et al. |
| 6,330,269 B1 | 12/2001 | Manasek et al. |
| 6,334,484 B1 | 1/2002 | Kandel |
| 6,563,855 B1 | 5/2003 | Nishi et al. |
| 6,890,479 B2 | 5/2005 | Manasek et al. |
| 7,895,957 B2 | 3/2011 | Inomata et al. |
| 8,997,842 B2 | 4/2015 | Manasek |
| 10,760,854 B2 * | 9/2020 | Manasek ................. F28F 21/08 |
| 2004/0194940 A1 | 10/2004 | Manasek et al. |
| 2007/0277965 A1 | 12/2007 | Manasek |
| 2008/0296006 A1 | 12/2008 | Manasek |

FOREIGN PATENT DOCUMENTS

| | | |
|---|---|---|
| DE | 8807171 U1 | 9/1988 |
| DE | 3820448 | 12/1989 |
| DE | 1021250 A1 | 1/1991 |
| DE | 9103291 U1 | 11/1991 |
| FR | 2336648 A1 | 7/1977 |
| GB | 1088827 A | 10/1967 |
| JP | 60-049840 A | 3/1985 |
| JP | 61-268956 A | 11/1986 |
| JP | 11254033 A | 9/1999 |
| WO | 0163193 A1 | 8/2001 |
| WO | 2006111315 A1 | 10/2006 |
| WO | 2014077567 A1 | 5/2014 |
| WO | 2020167313 | 8/2020 |

OTHER PUBLICATIONS

Korean Intellectual Property Office; International Search Report; Mail Date: Feb. 23, 2022; pp. 1-3.
Korean Intellectual Property Office; Written Opinion of the International Searching Authority; Mail Date: Feb. 23, 2022; pp. 1-5.

* cited by examiner

MULTI-HALF PIPE HEAT EXCHANGE SYSTEM FOR ELECTRIC ARC, METALLURGICAL OR REFINING FURNACES AND SYSTEM THEREOF

RELATED APPLICATIONS

This application claims the benefit of U.S. Provisional Patent Application Ser. No. 63/108,474, filed Nov. 2, 2020, the disclosure of which is hereby incorporated by reference in its entirety.

FIELD OF THE DISCLOSURE

The present disclosure relates generally to a method and to an apparatus for extending the operational life of electric arc furnaces, metallurgical furnaces, including metal smelting and refining furnaces. In particular, the disclosure relates to heat exchange systems used to protect such equipment.

BACKGROUND

It is known to use cooling elements to protect equipment used in various steel industry processes. Such equipment may need to operate in extreme heat-flux conditions. Conventional cooling elements typically comprise a plurality of tubes or pipes having water running through them and which are coupled together to form the cooling elements. Such conventional tubes may for example be 2.5 inch inner diameter ("ID") cylindrical tubes having maximum water velocities through the tubes of about six (6) to seven (7) feet per second. The high heat flux conditions in which these tubes may operate make it desirable to have higher heat transfer rates and higher water velocities than the conventional 2.5 inch ID tubes can deliver. It is also desirable to be able to choose to fabricate the tubes and resulting elements from any suitable material and using any method of fabrication suitable for the material being used.

SUMMARY

In one embodiment of the present disclosure, a cooling assembly for cooling exhaust gases emitted from a steel-making furnace, includes a plate configured to be coupled to the furnace, the plate having a first surface and a second surface, the first surface being opposite the second surface; a body comprising a defined length and a cross-sectional shape having a thickness defined between an outer surface and an inner surface thereof, the body including a first mounting end and a second mounting end; wherein, the first mounting end is mounted to the first surface at a first angle greater than 0°; wherein, the second mounting end is mounted to the first surface at a second angle greater than 0°, the second mounting end spaced from the first mounting end; wherein, a conduit is defined between the inner surface and first surface for a cooling fluid to flow therethrough.

In this embodiment, the first angle may be approximately the same as the second angle. Alternatively, the first angle may be different from the second angle. Further, the first angle and second angle may be each between 15° and 45°. Moreover, the assembly may include a second body comprising a defined length and a cross-sectional shape having a thickness defined between an outer surface and an inner surface thereof, the second body including a first mounting end and a second mounting end; wherein, the first mounting end of the second body is angularly mounted to the first surface at a location adjacent the second mounting end of the body; wherein, the body and second body are mounted to the first surface such that their respective lengths are parallel to one another.

In this embodiment, the body and second body may be welded to the first surface such that a single weld is disposed between the angled ends of the first mounting end of the second body, the second mounting end of the body, and the first surface. Further, the body may be formed from steel, iron, nickel or an aluminum-bronze alloy.

In another embodiment of the present disclosure, a cooling assembly for cooling exhaust gases emitted from a steel-making furnace includes a body configured to be coupled to a mounting surface of the furnace, the body comprising a defined length and a cross-sectional shape having a thickness defined between an outer surface and an inner surface thereof, the body including a first mounting end and a second mounting end; wherein, the body comprises a first portion, a second portion, and an intermediate portion integrally formed between the first and second portions; wherein, the first mounting end is integrally formed in the first portion, the first mounting end comprising a first end surface which is angularly coupled to the mounting surface; wherein, second mounting end is integrally formed in the second portion, the second mounting end comprising a second end surface which is angularly coupled to the mounting surface at a location spaced from the first mounting end; wherein, a first fluid conduit is defined between the inner surface of the first portion and the mounting surface; wherein, a second fluid conduit is defined between the inner surface of the second portion and the mounting surface.

In this embodiment, the intermediate portion may include a defined width between the first portion and the second portion, where the intermediate portion comprises a substantially flat surface disposed in contact with the mounting surface over the defined width. Further, the first portion may be in contact with the mounting surface at a first contact point; the second portion may be in contact with the mounting surface at a second contact point; the first contact point and second contact point each being a single point of contact at any location along the length of the body. Moreover, the first portion may be in contact with the mounting surface at a first contact point; the second portion may be in contact with the mounting surface at a second contact point; the intermediate portion may be in contact with the mounting surface along its width, where the contact between the intermediate portion and mounting surface is greater than a combined contact of the first portion and second portion with the mounting surface.

In this embodiment, the body may be formed from steel, iron, nickel or an aluminum-bronze alloy.

Also in this embodiment, the mounting surface may be formed from a plate having a defined length, width, and thickness, the plate comprising an opening formed therein; the body being coupled to the mounting surface such that the intermediate portion is aligned with the opening in the plate.

Moreover, a coupling mechanism may be provided for coupling the intermediate portion to the plate at the location of the opening. In one aspect, the coupling mechanism comprises a weld.

In this embodiment, a first weld may be disposed between the first mounting end and the mounting surface; and a second weld may be disposed between the second mounting end and the mounting surface.

Further, in this embodiment, the cooling assembly may include a second body comprising a defined length and a cross-sectional shape having a thickness defined between an outer surface and an inner surface thereof, the second body including a first mounting end and a second mounting end; wherein a third conduit is defined between the inner surface of the second body and the mounting surface, wherein the third conduit is aligned substantially parallel to the first and second conduits.

Moreover, in this embodiment, the second mounting end of the body may be coupled to the mounting surface adjacent to the first mounting end of the second body. Further, a single weld may couple the second mounting end of the body and the first mounting end of the second body to the mounting surface.

In a further embodiment of the present disclosure, a heat exchange system includes a furnace having means for heating an interior of the furnace and generating hot exhaust gases; a panel of sinuously winding piping having an inlet and an outlet, the piping forming a fluid passage through which a cooling fluid flows between the inlet and the outlet; an input manifold in fluid communication with the inlet of the panel; an output manifold in fluid communication with the outlet of the panel; the piping comprising a body configured to be coupled to a mounting surface of the furnace, the body comprising a defined length and a cross-sectional shape having a thickness defined between an outer surface and an inner surface thereof, the body including a first mounting end and a second mounting end; wherein, the body comprises a first portion, a second portion, and an intermediate portion integrally formed between the first and second portions; wherein, the first mounting end is integrally formed in the first portion, the first mounting end comprising a first end surface which is angularly coupled to the mounting surface; wherein, second mounting end is integrally formed in the second portion, the second mounting end comprising a second end surface which is angularly coupled to the mounting surface at a location spaced from the first mounting end; wherein, a first fluid conduit is defined between the inner surface of the first portion and the mounting surface, the first fluid conduit forming a portion of the fluid passage; wherein, a second fluid conduit is defined between the inner surface of the second portion and the mounting surface, the second fluid conduit forming another portion of the fluid passage.

DETAILED DESCRIPTION

In an electric arc furnace (EAF), a portion above a hearth or smelting area must be protected against the high internal temperatures of the furnace. The EAF vessel wall, cover or roof and duct work are particularly at risk from massive thermal, chemical, and mechanical stresses caused by charging the steel. Such stresses greatly limit the operational life of the furnace. The EAF is generally designed and fabricated as a welded steel structure which is protected against the high temperatures inside the furnace vessel by a refractory lining and water cooled panels. Water-cooled roof panels and water-cooled sidewall panels are located in portions of the furnace vessel above the melting/smelting area of the furnace.

In addition, furnace off-gas ducts are also comprised of a plurality of pipe around its circumference that protect the ductwork from the high temperatures and caustic gases produced during furnace operation. Existing water-cooled panels and ducts are made both with various grades and types of plates and pipes. Using water-cooled panels reduces refractory costs, enables steel makers to operate each furnace for a greater number of heats and enables the furnaces to operate at increased levels of power and chemical energy input. Such panels are designed to incorporate a plurality of pipes in serpentine fashion and hung on the inside wall of the electric arc furnace above the hearth, thereby forming a cooling surface between the interior and the furnace wall.

It is important to maintain a layer of slag on the hot side of the water cooled panels to protect the panels from thermal and arcing degradation during normal furnace operation. Slag cups, slag bars, slag pins and specially designed extruded pipe with splines on the hot side surface of the pipe may be used to retain splattered slag on the hot side surface of the panels. Slag solidifies on the pipes, forming an insulation barrier between the molten iron material and the cooling pipes and, consequently, the wall of the furnace.

Figure 1:
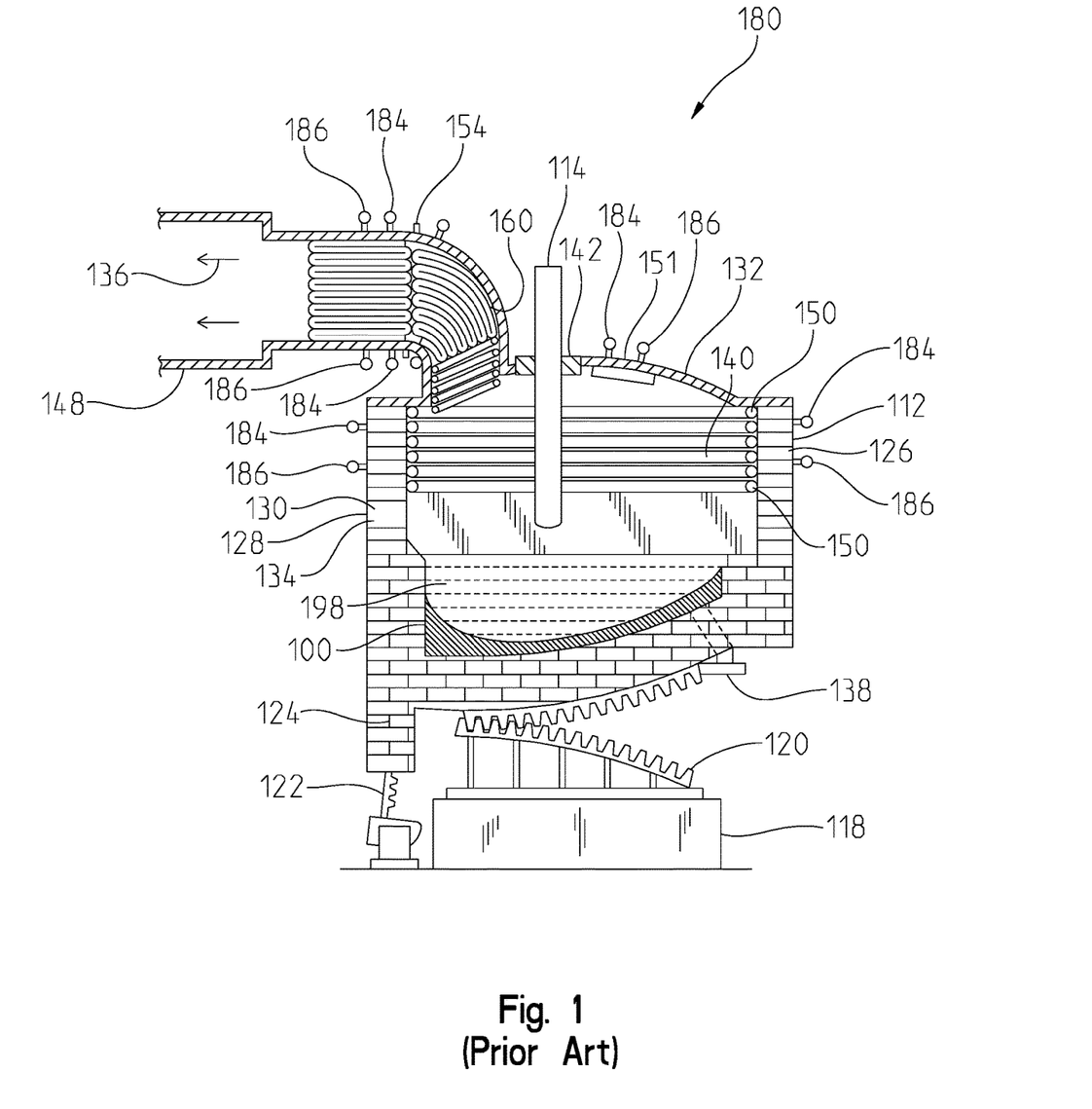
FIG. 1 illustrates a flow diagram of a melting process in a metallurgical furnace.

Referring to FIG. 1, one embodiment of a furnace is illustrated as an EAF type furnace 180. While the EAF is disclosed as one example, it is understood the principles and teachings of the present disclosure may be readily applied in a basic oxygen furnace (BOF) and the like. In FIG. 1, an EAF 180 may include a furnace shell 112, a plurality of electrodes 114, an exhaust system 116, a working platform 118, a rocker tilting mechanism 120, a tilt cylinder 122, and an off gas chamber. The furnace shell 112 may be movably disposed upon the rocker tilt 120 or other tilting mechanism. Further, the rocker tilt 120 may be powered by the tilt cylinder 122. The rocker tilt 120 may also be further secured upon the working platform 118.

The furnace shell 112 may include a dished hearth 124, a generally cylindrical side wall 126, a spout 128, a spout door 130, and a general cylindrical circular roof 132. The spout 128 and spout door 130 are located on one side of the cylindrical side wall 126. In the open position, the spout 128 may allow intruding air 134 to enter the hearth 124 and partially burn gasses 136 produced from smelting. The hearth 124 is formed of a suitable refractory material. At one end of the hearth 124 is a pouring box having a tap means 138 at its lower end. During a melting operation, the tap means 138 is closed by a refractory plug, or a slidable gate. Thereafter, the furnace shell 112 is tilted, the tap means 138 is unplugged, or open and molten metal is poured into a teeming ladle, tundish, or other device, as desired.

The inside wall 126 of the furnace shell 112 may be fitted with water cooled panels 140 of sinuously winding piping 150. The panels, in effect serve as an interior wall in the furnace 180. The manifolds, which supply cool water and a return, are in fluid communication with the panels 140. Typically, the manifolds are positioned peripherally in a fashion similar to the illustrated exhaust ducts 144.

The heat exchanger system 110 produces a more efficient operation and prolongs the operation life of the EAF furnace 110. In one illustrative embodiment, the panels 140 may be assembled such that the sinuously winding piping has a generally horizontal orientation. The piping 150 can be linked with a linkage or have a base that is mounted to the wall. Alternatively, the panels 140 can be mounted such that the sinuously winding piping 150 has a generally vertical orientation. The upper ends of the panels 140 may define a circular rim at the upper margin of the side wall 126 portion of the furnace 180.

The heat exchanger system 110 can be fitted to the roof 132 of the furnace 180, wherein the water cooled panels 140 have a curvature that substantially follows the domed contour of the roof 132. The heat exchanger system 110 may be deployed on the inside of side wall 126 of the furnace 180, the roof 132 and the entrance of the exhaust system 116, as well as throughout the exhaust system 116. As such, the heat exchanger system 110 can protect the furnace and cools the hot waste gasses 136 as they are ducted to a bag house or other filtering and air treatment facilities, where dust is collected and the gasses are vented to the atmosphere.

In operation, hot waste gasses 136, dust and fumes are removed from the hearth 124 through a vent 146 in the furnace shell 112. The vent 146 may be in communication with an exhaust system.

The panel 140 can have a plurality of axially arranged pipes 150. U-shaped elbows can connect adjacent sectional lengths of piping or pipes 150 together to form a continuous piping system. Linkages and the like that additionally serve as spacers may be between adjacent pipes 150, and they provide structural integrity of the panel 140 and are determinative of curvature to the panel 140.

The heat exchange system or heat exchanger 110 may include at least one panel of the sinuously winding piping 150 having an inlet (not shown) and an outlet (not shown), an input manifold in fluid communication with the inlet of the at least one panel, an-output manifold in fluid communication with the outlet of the at least one panel, and a cooling fluid flowing through the piping 150. The heat exchanger system 110 cools hot fume gasses 136 and dust that is being evacuated from the metallurgical furnace 180 and its supporting components. The piping is an assemblage of sectional lengths of connected tubes mounted side-by-side, wherein the connected tubes are secured to each other with the linkage, therein forming the at least one panel 150.

It has been determined that one illustrative and desirable composition for fabricating the piping 150 is of an aluminum bronze alloy. Aluminum bronze alloys have been found to have a higher than expected thermal conductivity, resistance to etching by the stream of hot gasses (modulus of elasticity), and good resistance to oxidation. Thus, the operational life of the heat exchanger is extended. Corrosion and erosion of the heat exchanger and related components is reduced, when they are fabricated with aluminum bronze. Aluminum bronze has thermal conductivity that is 41% higher than P22 (about 96% Fe, 0.1% C, 0.45% Mn, 2.65% Cr, 0.93% Mo) and 30.4% than carbon steel (A106B). The heat exchangers fabricated using aluminum bronze and alloys thereof are more efficient, and have a longer operational life than furnace constructed of refractive materials and or other metal alloys.

It has also been determined that the piping 150 may be extruded, and that extruding may help the piping resist corrosion, erosion, pressure, and thermal stress. The piping can be curved or bent to match the curvature of a wall to which it is being attached, if so needed. More typically, the individual sections of piping are secured to each other with an angled linkage such that the resulting panel has a curvature that is comparable to the curvature of the wall.

In the embodiment of FIG. 1, the sinuously winding piping 150 may be formed by a plurality of longitudinal piping sections in which two of the piping sections are connected by an elbow. It is often difficult to assemble these sections to the elbows, and the present disclosure provides an arrangement to better facilitate and improve the welding process.

Illustratively, high heat flux resistant, fluid-cooled elements having relatively high heat transfer rates and high water velocities according to the present disclosure are provided. It will be appreciated that the elements may have any suitable fluid such as a liquid including, for example, water running therethrough. The present disclosure provides a way to select a wider range of materials for manufacture of user selectively shaped and designed water-cooled elements for steel industry applications. As noted, liquids or coolants other than water also fall within the scope of the present disclosure. The elements will have the ability to better withstand the hostile and ever changing requirements in the furnaces, flue gas systems, off gas hoods, skirts, combustion chambers, drop out boxes etc. due to the inherent and improved coolant velocity within the tube(s)/element(s) and the resulting increased heat transfer capability. This present disclosure allows for the selection of fabrication material and method of fabrication including, for example, by rolling, forging, casting or extruding, as desired, to the required or desired cross-sectional radius in order to optimize the heat transfer and elasticity requirements for the particular application and without limitation to current requirements to select the tube/pipe from materials that are available on the commercial market.

Figure 2:
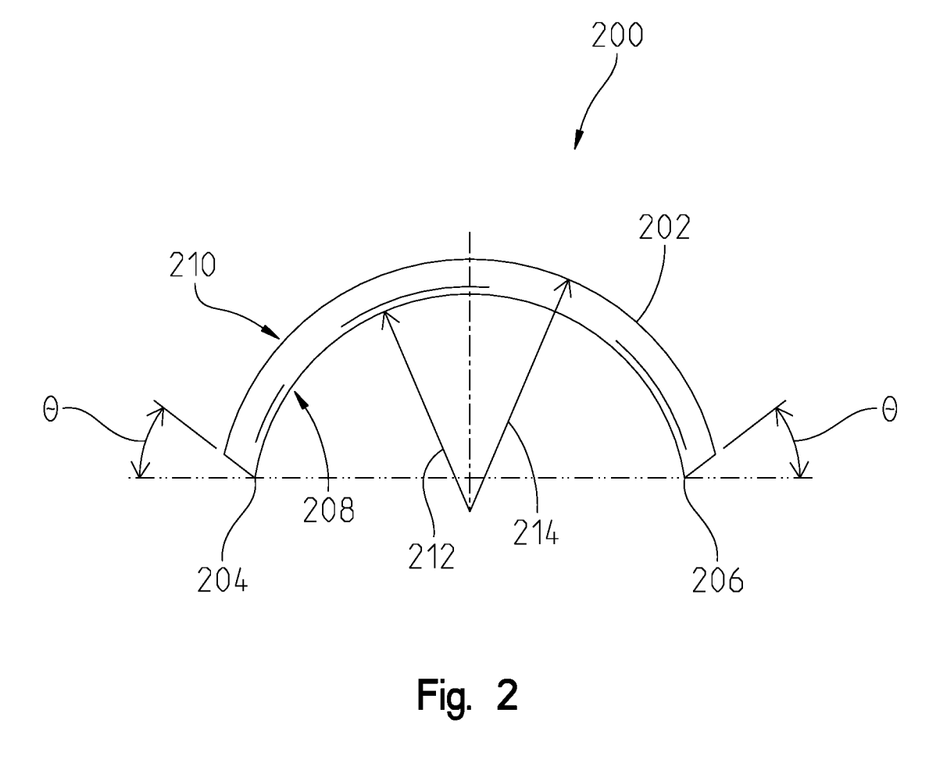
FIG. 2 illustrates a single half pipe cooling element.

Referring to FIG. 2, a cooling element 200 or heat exchange apparatus in the form of a single half pipe 202 or half tube 202 is formed into a desired shape such as, for example, a half pipe 202 having a cross-section approximating a substantially bisected circle or polygon, including a quadrilateral, a parallelogram, a hexagon or octagon in cross section. In other words, the half pipe 202 illustratively may approximate a polyhedron or cylinder substantially bisected along a plane of a diameter thereof to form a semi-polyhedron or the depicted illustrative semi-cylindrical body 202 as described below. The illustrative bisected or semi-cylindrical body or half pipe 202 extends from a first mounting end 204 to a second and opposite mounting end 206 to define an arcuate and generally concave inner surface 208 and an arcuate and generally convex outer surface 210 arcing respectively between the mounting ends 204, 206. In other words, the single tube or half pipe 202 represents either half of a cylindrical body divided or substantially bisected diametrically.

Figure 4:
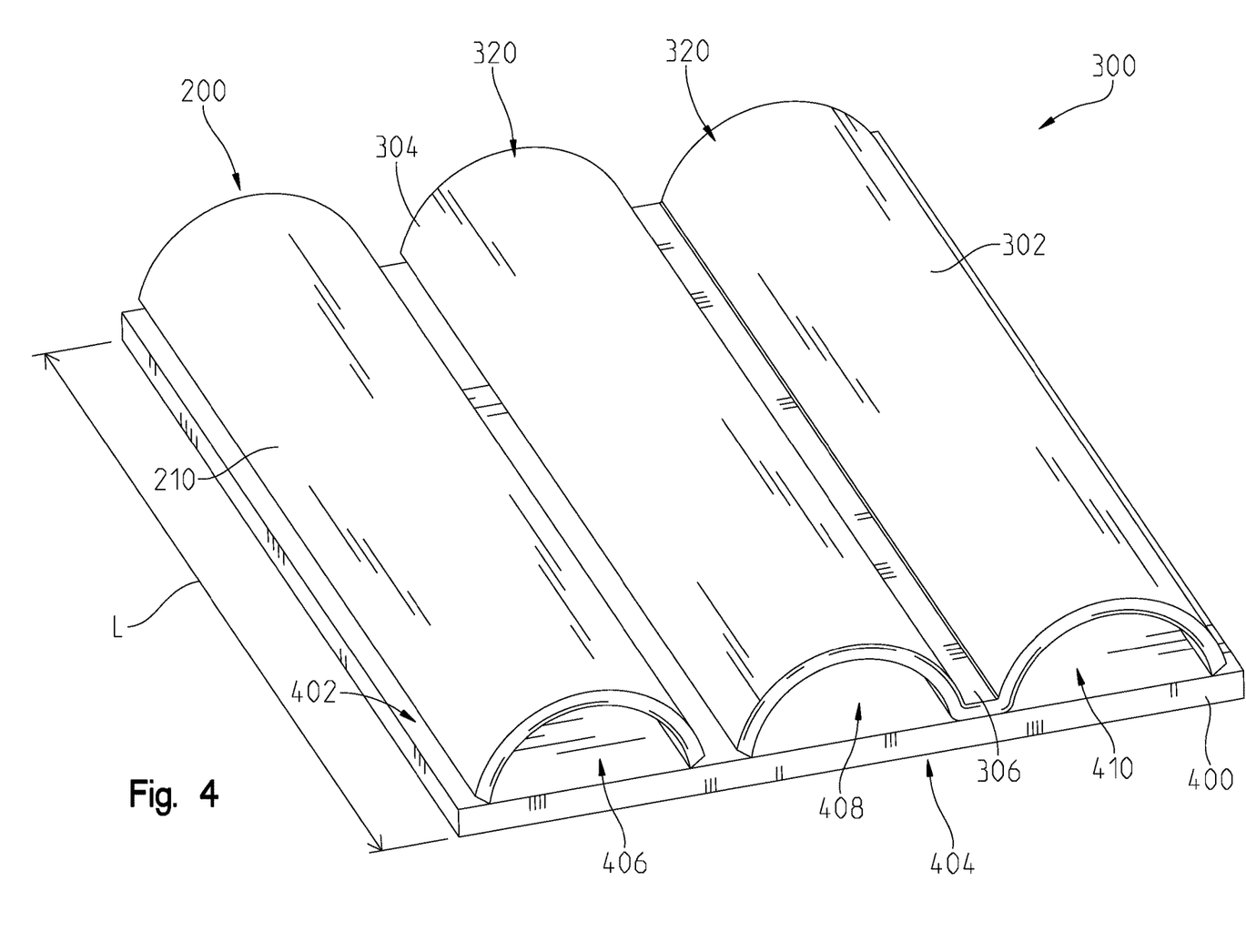
FIG. 4 illustrates a perspective view of a combined single and double half pipe cooling assembly.

The opposing mounting ends 204, 206 are illustratively configured to mount or couple the single half pipe 202 to, for example, a mounting plate 400 as shown in FIG. 4. It will be appreciated that the single half pipe 202 may be mounted directly to a piece of equipment such as, for example, a wall of a furnace 180. In FIG. 4, the single half pipe 202 is shown mounted or coupled to the pipe-mounting face 402 of the mounting plate 400 to form an illustrative cooling element 200. The single half pipe 202 may include a defined length, L, which may be selected based on the desired heat transfer characteristics and space available for the pipe. Opposite the pipe-mounting face 402 of the mounting plate 400 is an equipment-mounting face 404, which illustratively is configured to mount the plate 400 to a piece of equipment.

Figure 5:
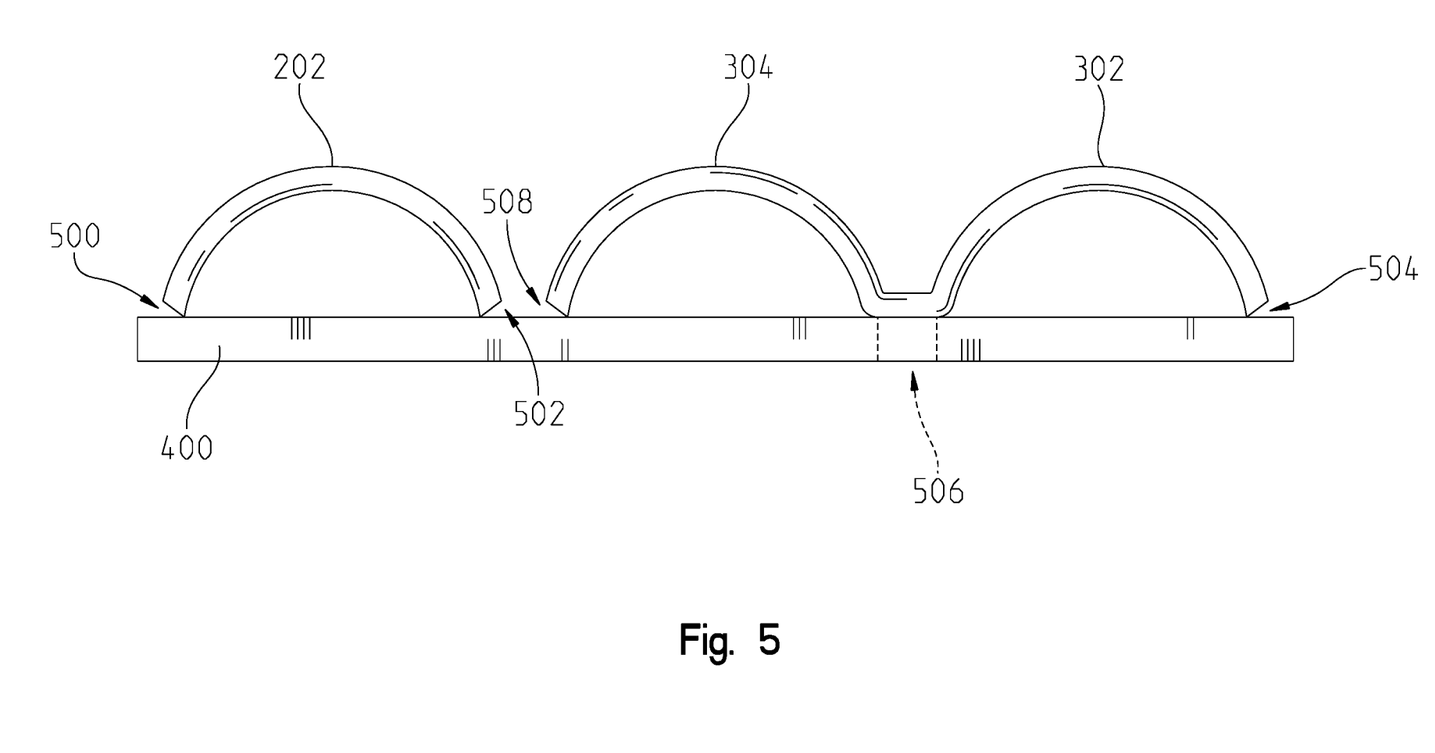
FIG. 5 illustrates a front view of the assembly of FIG. 4.

The single half pipe 202 may be mounted or coupled to the plate 400 in any suitable manner including, for example, by welding along the length of the pipe 202 on each side or mounting end 204, 206 thereof. For instance, as shown in FIG. 5, the single half pipe 202 may be mounted via a first weld 500 along the first end 204 and a second weld 502 along a second end 206 thereof. Each of the first and second welds may be water tight welds to protect the integrity of the pipe 202 and prevent leakage of fluid that may flow through an interior passageway or channel 406 of the single half pipe 202.

As shown in FIG. 2, each mounting end 204, 206 may be angled with respect to the bisected plane (i.e., the dashed line in FIG. 2) or plate 400. In one instance, the mounting end 204, 206 may comprise an angle Θ, where Θ is greater than 0°. In one non-limiting example, angle Θ may be greater than 0° but less than 90°. In a second non-limiting example, angle Θ may be greater than 0° and less than 75°. In a third non-limiting example, angle Θ may be greater than 0° and less than 60°. In a fourth non-limiting example, angle Θ may be greater than 0° and less than 45°. In a fifth non-limiting example, angle Θ may be greater than 15° and less than 45°. In a sixth non-limiting example, angle Θ may be greater than 30° and less than 45°. In a further non-limiting example, angle Θ may be approximately between 30-40°, where approximately is defined as being within 2-3°.

Due to the angled mounting ends, each mounting end may contact the surface 402 of the mounting plate 400 or wall of the furnace at a single point of its end in the cross-sectional view of FIG. 2. With the mounting end having approximately the same length as the entire half pipe cooling element 200, the mounting end may contact the surface at this point along the entire length of the mounting end.

With the mounting ends being angled, the first weld 500 and second weld 502 are capable of being disposed between a top surface of the mounting face of the plate 400 or wall and at least a portion of a bottom surface of the respective mounting end 204, 206. This further enables a water-tight seal therebetween to prevent or inhibit leakage of a cooling fluid that is flowing through the cooling element or half pipe. Moreover, the respective mounting end is more securely held to the mounting surface with the weld being stronger than if the bottom surface of the mounting end was located flush with the mounting surface.

Any single half pipe mounting end 204, 206 illustratively and optionally may have an extended portion or tab (not shown). For example, when the mounting ends 204, 206 of adjacent pipes have a tab or radially-extending portion, a weld may be used to attach or couple with the plate 400 or piece of equipment those respective ends 204, 206 along their lengths.

When a single half pipe 202 and plate 400 are coupled together, the channel 406 is formed and is configured to contain therein and allow the passage therethrough of a fluid including without limitation any suitable coolant such as, for example, a liquid. One non-exclusive example of a suitable liquid is water. The conduit or channel 406 may also be formed by directly mounting together a single half pipe 202 and a piece of equipment. It will also be appreciated that the conduit or channel 406 may be formed by forming a closed pipe 202 having a generally flat surface extending between mounting ends 204, 206 along a diametrical plane. Such an illustrative surface, which need not be flat or planar, may be mounted together with either a plate 400 or directly with a piece of equipment.

The single half pipe 202 may include several dimensions including, without limitation, an inner diameter representing the length of the diametrical plane extending between mounting ends 204, 206. As a result, the inner radius 212 and the outer radius 214 respectively representing the length of a plane between a mid-point of the diametrical plane and any point on the respective inner surface 208 and outer surface 210. These dimensions may be selected as desired.

Figure 3:
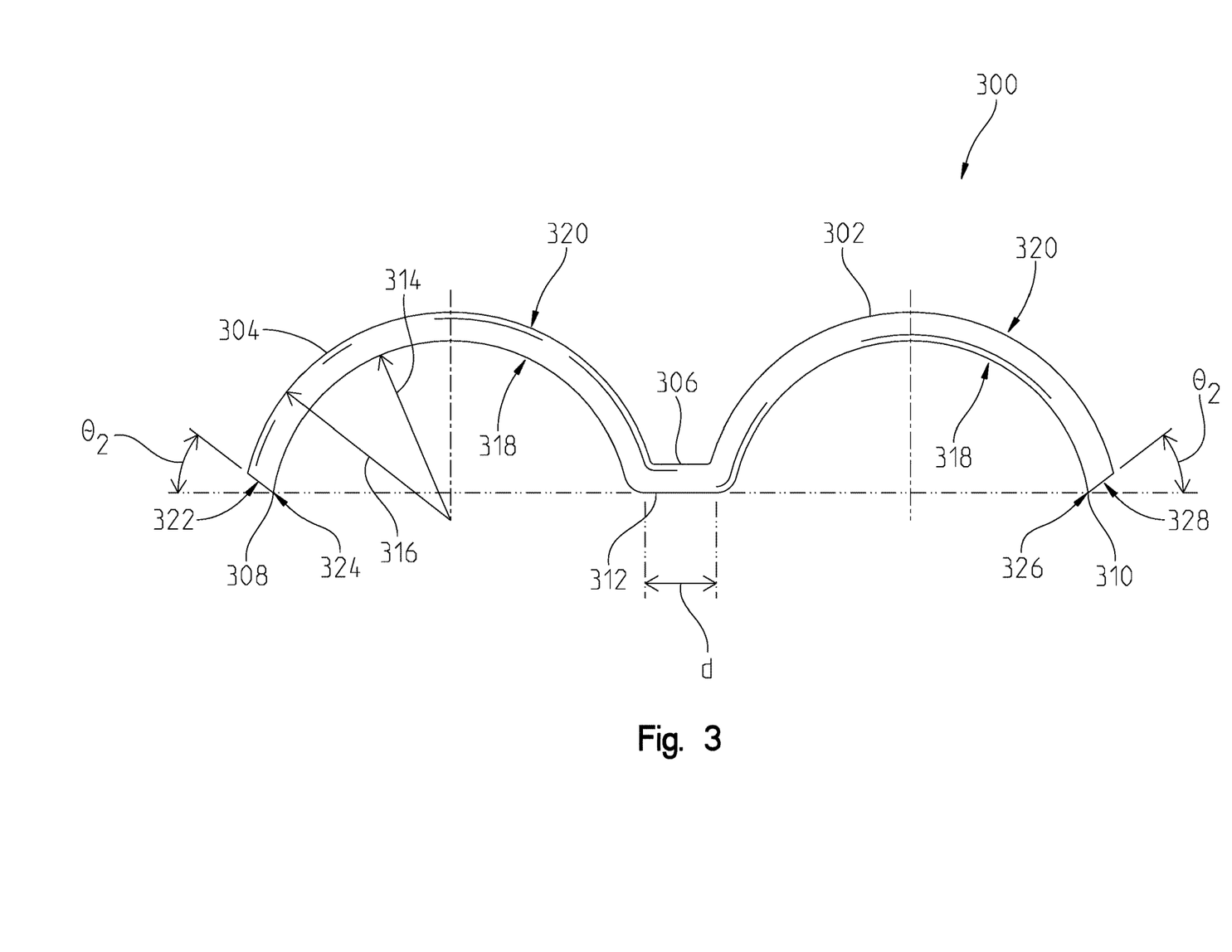
FIG. 3 illustrates a double half pipe cooling element.

Referring now to FIG. 3, another embodiment of a cooling element is shown. Here, the cooling element is depicted in the form of a double half pipe 300 or tube. The double half pipe 300 may be produced as a pair of single half pipes 202 but as a single unit. The double half pipe 300 of FIG. 3 is shown having a first half pipe portion 302 and a second half pipe portion 304. The first and second portions may be formed into a desired shape such as, for example, having a cross-section approximating a substantially bisected circle or polygon, including a quadrilateral, a parallelogram, a hexagon or octagon in cross section. In other words, each portion may approximate a polyhedron or cylinder substantially bisected along a plane of a diameter thereof to form a semi-polyhedron or the depicted illustrative semi-cylindrical body 302, 304 as described below.

The first half pipe portion 302 and second half pipe portion 304 may be integrally formed with a third or intermediate portion 306 defined therebetween. The intermediate portion 306 may have a substantially flat surface 312 or contact portion where it can be mounted to a plate 400 or other equipment. The intermediate portion 306 may comprise a defined width or distance, d, between the first and second pipe portions as shown in FIG. 3.

In the illustrated embodiments of the present disclosure, the double half pipe cooling element 300 is shown with only a pair of half pipe portions with a single intermediate portion integrally formed therebetween. However, the present disclosure is not intended to be limited to this configuration. Instead, it may be possible to have two or more half pipe portions with a respective intermediate portion formed between each pair of half pipe portions. Thus, in one embodiment, a cooling element may include three half pipe portions and a pair of intermediate portions integrally formed between each of the two pairs of half pipe portions. In a further embodiment, a cooling element may include four half pipe portions and three intermediate portions integrally formed between two of the four half pipe portions. In yet another embodiment, a cooling element may include X number of half pipe portions and Y intermediate portions, where X is ≥2 and Y is equal to X−1.

The illustrative bisected or semi-cylindrical body or half pipe portion 302, 304 may extend from a first mounting end 308 to a second and opposite mounting end 310 to define an arcuate and generally concave inner surface 318 and an arcuate and generally convex outer surface 320 arcing respectively between the mounting ends 308, 310. The distance between mounting ends 308, 310 may be further defined as the sum of an inner diameter of the first half pipe portion 302, an inner diameter of the second half pipe portion 302, and the width or distance, d, of the intermediate portion 306.

Each half pipe portion of a cooling element may include several dimensions including an inner radius 314 and the outer radius 316 respectively representing the length of a plane between a mid-point of the diametrical plane and any point on the respective inner surface 318 and outer surface 320. These dimensions may be selected as desired. The thickness of each half pipe portion may be defined as the difference between the inner and outer radii or surface. In one example, the thickness of each portion may be uniform. In another example, the thickness may vary from one end to an opposite end. In a further example, the thickness of the half pipe portion may be the same as the thickness of the intermediate portion. In other words, the thickness of the intermediate portion may be approximately the same as the difference between the outer radius 316 and the inner radius 318. This difference in radii may be uniform between the first end 308 and the second end 310. In an alternative example, the difference between the outer radius and inner radius of the first half pipe portion 302 may differ from the difference between the outer radius and inner radius of the second half pipe portion 304.

As shown in FIG. 3, each mounting end 308, 310 may be angled with respect to the bisected plane (i.e., the dashed line in FIG. 3) or plate 400. In one instance, each mounting end 308, 310 may comprise an angle $\Theta_2$, where $\Theta_2$ is greater than 0°. In one non-limiting example, angle $\Theta_2$ may be greater than 0° but less than 90°. In a second non-limiting example, angle $\Theta_2$ may be greater than 0° and less than 75°. In a third non-limiting example, angle $\Theta_2$ may be greater than 0° and less than 60°. In a fourth non-limiting example, angle $\Theta_2$ may be greater than 0° and less than 45°. In a fifth non-limiting example, angle $\Theta_2$ may be greater than 15° and less than 45°. In a sixth non-limiting example, angle $\Theta_2$ may be greater than 30° and less than 45°. In a further non-limiting example, angle $\Theta_2$ may be approximately between 30-40°, where approximately is defined as being within 2-3°. The angle of the first mounting end 308 may be substantially the same as the second mounting end 310 in one embodiment, where substantially is within 2-3 degrees. In another embodiment, the angle of the first mounting end 308 may be substantially different than the second mounting end 310, i.e., the difference is greater than 3 degrees.

Due to the angled mounting ends, each mounting end 308, 310 may contact the surface 402 of the mounting plate 400 or wall of the furnace at a single point of its end in the cross-sectional view of FIG. 3. For instance, the first mounting end 308 may contact the surface 402 at a first contact point 324, and the second mounting end 310 may contact the surface 402 at a second contact point 326, where the first and second contact points are spaced apart. The first mounting end 308 may comprise a first end surface 322 which contacts the surface 402 at the first contact point 324, but the remainder of the first end surface 322 may not contact the surface 402. In the same way, the second mounting end 310 may comprise a second end surface 328 which contacts the surface 402 at the second contact point 326, but the remainder of the second end surface 328 may not contact the surface 402. With the mounting ends having approximately the same length as the entire half pipe cooling element 300, the mounting end may contact the surface at this point along the entire length of the mounting end.

With the mounting ends 308, 310 being angled, a first weld 508 and second weld 510 are capable of being disposed between a top surface 402 of the mounting face of the plate 400 or wall and of the furnace and at least a portion of a bottom surface 322, 328 of the respective mounting ends 308, 310. This further enables a water-tight seal therebetween to prevent or inhibit leakage of a cooling fluid that is flowing through the cooling element or half pipe. Moreover, the respective mounting end is more securely held to the mounting surface with the weld being stronger than if the bottom surface of the mounting end was located flush with the mounting surface.

In FIG. 3, the double half pipe 300 may selectively be fabricated from any suitable material including, for example, steel (e.g., stainless steel, cast steel, extruded steel and drawn steel), iron, including cast iron, nickel, including nickel alloy, as well as any other suitable element, composite or alloy such as aluminum-bronze alloys. In addition, the material selections for the pipe 300 or tube may be selected from a wider range of flat or shaped materials, which may be rolled, forged, cast or extruded into the desired semi-circular cross section or semi-cylindrical shape, which improves the operability of the cooling element relative to the prior art circular tube and cooling elements formed therefrom. The higher heat transfer of the present disclosure may have the effect of improving equipment longevity plus on-line reliability and up-time because the equipment will be better suited to resist the effects of the high heat flux, corrosive and abrasive atmosphere in the furnace, flue gas system or combustion chamber, and any other equipment protected by one or more assembly(s) of such element(s).

In one embodiment of the present disclosure, a method of fabricating a multi-half pipe cooling element is provided. Here, a length of bar material (material to be selected based on the application requirement as known to those skilled in the art) may be rolled, formed, cast or extruded into one or more desired arcs, along its length, to meet the cross-sectional area requirement of the cooling element. The material may be selectively fabricated from any suitable material including, for example, steel (e.g., stainless steel, cast steel, extruded steel and drawn steel), iron (e.g., cast iron), nickel (e.g., nickel alloy), as well as any other suitable element, composite or alloy including, for example, aluminum-bronze alloys.

The material may be selected as being substantially flat for the fabrication process. The intermediate portion between each arc or half portion may be formed at the same time during this fabrication process. The cross-sectional area may be adjusted to meet the desired coolant velocity, pressure drop and residence time in the cooling element required to optimize the operating life of the cooling element.

In this embodiment, the entire length of the bar may have a generally consistent geometry throughout its length. Each arc or half portion that is rolled, formed, cast or extruded may generally be about a 180 degree arc from end to end to simulate a multi-half pipe/tube layout. The resulting arcs can also be designed to have lips or wings on their opposing ends to allow the plurality of tubes to be welded together. The outer surface may be generally smooth or incorporate geometries as required for a particular application such as, for example, any slag retention devices including ridges, splines, heat sinks, or any indentations. The double or multi-half pipe cooling element 300 as shown in FIG. 3 may have advantages over the single half pipe cooling element 200 of FIG. 2 due to its ease of manufacturability and can provide better performance due to the elimination of nearly half of the welding. In particular, the cooling element 300 of FIG. 3 comprises two or more half pipes manufactured as one unit, for example, by extrusion or forming. As such, the fabrication of this type of cooling element can eliminate approximately 50% of the welding, which consequently can avoid any potential weld defects and failures associated with a single half pipe cooling element.

Referring to the embodiment of FIG. 4, a double half pipe cooling element 300 is shown mounted to a plate 400 adjacent to a single half pipe cooling element 200. This type of arrangement is possible in accordance with the teachings of the present disclosure. When mounted to the plate 400 or equipment, the first half pipe portion 302 defines a conduit or channel 410 between the inner surface 318 thereof and the mounting surface 402 of the plate 400. As a result, a coolant such as water can flow through the conduit or channel 410. Similarly, the second half pipe portion 304 defines a conduit or channel 408 between its inner surface 318 and the mounting surface 402 of the plate 400. Moreover, a coolant such as water can flow through the conduit or channel 408 in a direction that is approximately parallel to that of which a coolant flows in the other conduits or channels 406, 410.

In an alternative embodiment, a system that utilizes the single and/or double half pipe may have a first fluid source (e.g., water) and a second fluid source (e.g., air or other coolant). The system may be designed such that the first fluid source is fluidly coupled to the first channel 410 and the second fluid source is fluidly coupled to the second channel 408. Alternatively, the first fluid source may be fluidly coupled to each channel 406 of the single half pipes 200 and the second fluid source may be fluidly coupled to each channel 408, 410 of the double half pipes 300. Other arrangements are possible, but the use of more than fluid is possible. For instance, in some embodiments, there may be two or more fluid sources such that two or more different fluids may pass through the various channels or conduits to help providing cooling to the furnace.

Figure 6:
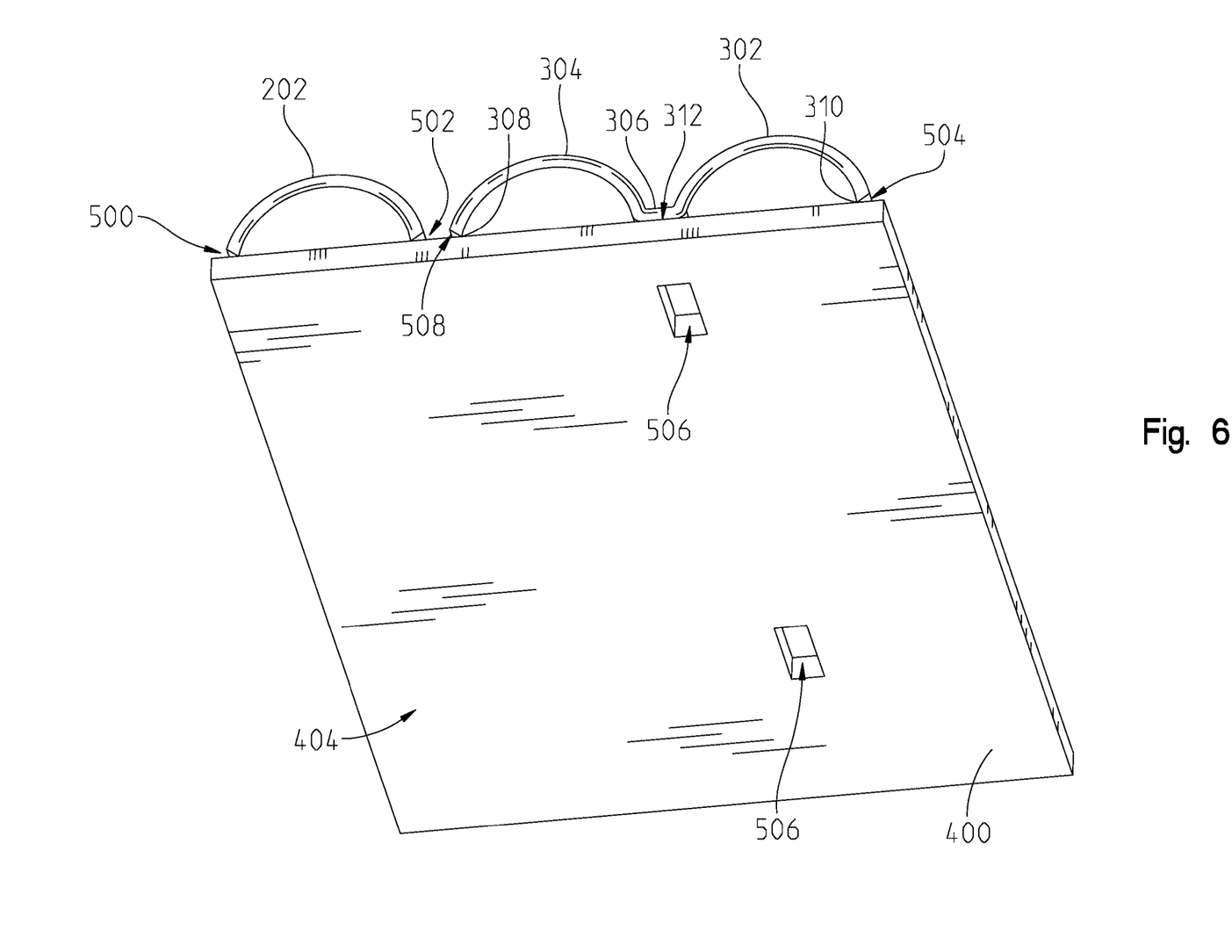
FIG. 6 illustrates a bottom front perspective view of the assembly of FIG. 4.

In FIGS. 5 and 6, the combined cooling elements are shown. Specifically, the manner in which the double or multi-half pipe cooling element 300 is mounted or otherwise coupled to the mounting plate or other surface (e.g., wall of a furnace or other equipment) is illustrated. Here, for example, the first end 308 may be welded via a first weld 508 and the second end 310 may be welded via a second weld 504. Each weld is desirably a water tight weld to prevent any leakage of the coolant flowing through the half pipes, and to further protect against any moisture or corrosion of the pipe. While it is shown that the half pipes are coupled or mounted to the plate 400 via welding, it is to be appreciated that other forms of coupling or attaching the cooling element 300 to the plate 400 may be implemented. Depending upon the application and environment, the cooling element 300 may be coupled mechanically via a fastener, adhesive, or any other known way besides welding. Further, adhesive or a mechanical fastener may couple the intermediate portion 306 to the plate 400 or wall whereas welding, adhesive or other coupling means may be used for coupling the mounting ends thereto.

Although in FIG. 5 the single half pipe cooling element 200 and the double half pipe cooling element 300 are shown as being welded to the plate 400 with their own welds, it is possible in an alternative embodiment where the second weld 502 and first 508 are a single weld. Further, in this illustrated embodiment of FIG. 5, the conduits or channels defined by the different cooling elements may be substantially parallel to one another along their respective lengths.

As shown in FIG. 6, the multi-half pipe cooling element 300 may also be coupled to the plate 400 or other structure by coupling the contact surface 312 of the intermediate portion 306 to the plate 400 or other structure. In this embodiment, a slot or opening 506 may be formed in the plate 400 or structure (e.g., equipment, furnace wall, etc.) at the location of the intermediate portion 306. As a result, a weld or other coupling mechanism may be used to couple the intermediate portion 306 of the cooling element 300 to the plate 400. In FIG. 6, a plurality of slots or openings 506 may be formed in the plate 400 so that access to the contact surface 312 is available. In one example, the contact surface 312 may be welded to the plate 400 via the one or more slots 506. Each slot 506 or opening may be spaced longitudinally and in alignment with the contact surface 312 of the intermediate portion 306. A secure weldment at the slots or openings 506 can ensure that coolant does not leak through the slot or opening 506, nor does the coolant leak from one conduit 408 to an adjacent conduit 410.

The plate 400 or other structure may be designed and/or fabricated to include a plurality of slots or openings 506 formed therein and corresponding to the number of intermediate portions 306 are provided in a cooling element 300 to be mounted thereto. Thus, the assembly process or method of mounting a cooling element 300 to the plate 400 may include forming a desired number of slots in the plate based on the size and number of intermediate portions 306 provided in the cooling element 300. Further, each end 308, 310 of the cooling element 300 may be mounted to the mounting surface 402 of the plate 400 via welding or other desired process. Moreover, each intermediate portion 306 may be coupled via welding or other process to the plate 400 via each slot or opening 506.

With the slots or openings, the amount of welding may be reduced for mounting the cooling element 300 to the plate 400, particularly when compared to mounting two or more of the single half pipe cooling elements 200 to the same plate. Each single half pipe cooling element 200 requires a water tight weld applied to each end thereof, and the result is only a single channel or conduit 406 through which a coolant may flow. On the other hand, a multi-half pipe cooling element 300 may only include welds along each end and then at each slot or opening 506. The result, however, is that you achieve a plurality of channels or conduits.

While the disclosure has been illustrated and described in detail in the foregoing drawings and description, the same is to be considered as illustrative and not restrictive in character, it being understood that only illustrative embodiments thereof have been shown and described and that all changes and modifications that come within the spirit of the disclosure are desired to be protected.

The invention claimed is:

1. A cooling assembly for cooling exhaust gases emitted from a steel-making furnace, comprising:
   a body configured to be coupled to a mounting surface of the furnace, the body comprising a defined length and a cross-sectional shape having a thickness defined between an outer surface and an inner surface thereof, the body including a first mounting end and a second mounting end;
   wherein, the body comprises a first portion, a second portion, and an intermediate portion integrally formed between the first and second portions;
   wherein, the first mounting end is integrally formed in the first portion, the first mounting end comprising a first end surface which is angularly coupled to the mounting surface;
   wherein, the second mounting end is integrally formed in the second portion, the second mounting end comprising a second end surface which is angularly coupled to the mounting surface at a location spaced from the first mounting end;
   wherein the mounting surface includes an opening formed therein, the body being coupled to the mounting surface such that the intermediate portion is aligned with the opening;
   wherein, a first fluid conduit is defined between the inner surface of the first portion and the mounting surface;
   wherein, a second fluid conduit is defined between the inner surface of the second portion and the mounting surface.

2. The cooling assembly of claim 1, wherein the intermediate portion comprises a defined width between the first portion and the second portion, where the intermediate portion comprises a substantially flat surface disposed in contact with the mounting surface over the defined width.

3. The cooling assembly of claim 1, wherein:
   the first portion is in contact with the mounting surface at a first contact point;

the second portion is in contact with the mounting surface at a second contact point;

the first contact point and second contact point each being a single point of contact at any location along the length of the body.

4. The cooling assembly of claim 1, wherein:

the first portion is in contact with the mounting surface at a first contact point;

the second portion is in contact with the mounting surface at a second contact point;

the intermediate portion is in contact with the mounting surface along its width, where the contact between the intermediate portion and mounting surface is greater than a combined contact of the first portion and second portion with the mounting surface.

5. The cooling assembly of claim 1, wherein the body is formed from steel, iron, nickel or an aluminum-bronze alloy.

6. The cooling assembly of claim 1, further comprising a coupling mechanism for coupling the intermediate portion to the mounting surface at the location of the opening.

7. The cooling assembly of claim 6, wherein the coupling mechanism comprises a weld.

8. The cooling assembly of claim 7, further comprising:

a first weld disposed between the first mounting end and the mounting surface; and a second weld disposed between the second mounting end and the mounting surface.

9. The cooling assembly of claim 1, further comprising a second body comprising a defined length and a cross-sectional shape having a thickness defined between an outer surface and an inner surface thereof, the second body including a first mounting end and a second mounting end;

wherein a third conduit is defined between the inner surface of the second body and the mounting surface, wherein the third conduit is aligned substantially parallel to the first and second conduits.

10. The cooling assembly of claim 9, wherein the second mounting end of the body is coupled to the mounting surface adjacent to the first mounting end of the second body.

11. The cooling assembly of claim 10, wherein a single weld couples the second mounting end of the body and the first mounting end of the second body to the mounting surface.

* * * * *